(12) United States Patent
Ahn et al.

(10) Patent No.: US 9,577,239 B2
(45) Date of Patent: Feb. 21, 2017

(54) SECONDARY BATTERY HAVING AN ELECTRODE ASSEMBLY

(75) Inventors: Changbum Ahn, Yongin-si (KR); Youngbae Sohn, Yongin-si (KR); Jeongsoon Shin, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 885 days.

(21) Appl. No.: 12/910,749

(22) Filed: Oct. 22, 2010

(65) Prior Publication Data

US 2011/0129707 A1 Jun. 2, 2011

(30) Foreign Application Priority Data

Nov. 27, 2009 (KR) .................. 10-2009-0115962

(51) Int. Cl.
| | |
|---|---|
| *H01M 10/0587* | (2010.01) |
| *H01M 2/26* | (2006.01) |
| *H01M 2/22* | (2006.01) |
| *H01M 10/02* | (2006.01) |
| *H01M 10/04* | (2006.01) |

(52) U.S. Cl.
CPC .............. *H01M 2/263* (2013.01); *H01M 2/22* (2013.01); *H01M 10/02* (2013.01); *H01M 10/049* (2013.01); *H01M 10/0431* (2013.01)

(58) Field of Classification Search
CPC H01M 2/0217; H01M 2/263; H01M 10/0583; H01M 2/30; H01M 2/266; H01M 2/22; H01M 10/02; H01M 10/0431; H01M 10/0587; H01M 10/647
USPC ........................................... 429/161, 94, 211
See application file for complete search history.

(56) References Cited

U.S. PATENT DOCUMENTS

| | | | |
|---|---|---|---|
| 5,439,760 A * | 8/1995 | Howard et al. .................. | 429/94 |
| 6,159,253 A * | 12/2000 | Lund ............................. | 29/623.1 |
| 7,442,465 B2 * | 10/2008 | Kim et al. ..................... | 429/129 |
| 2004/0009391 A1 | 1/2004 | Lee | |

(Continued)

FOREIGN PATENT DOCUMENTS

| | | |
|---|---|---|
| CN | 1787271 A | 6/2006 |
| EP | 2 048 736 A1 | 4/2009 |

(Continued)

OTHER PUBLICATIONS

EPO Extended Search Report dated Oct. 11, 2011, for corresponding European Patent Application No. 10192403.3, 5 pages.

(Continued)

*Primary Examiner* — Maria J Laios
(74) *Attorney, Agent, or Firm* — Lewis Roca Rothgerber Christie LLP (57) ABSTRACT

A secondary battery including an electrode assembly. The electrode assembly includes a first electrode including a plurality of first electrode tabs extending to a side of the first electrode, a second electrode including a plurality of second electrode tabs extending to a side of the second electrode, and a separator between the first electrode and the second electrode and insulating the first electrode and the second electrode from one another. The electrode assembly is in a wound jelly roll shape. The plurality of first electrode tabs are in one of four quadrants formed by a long axis and a short axis of the wound electrode assembly. The plurality of second electrode tabs are in a different one of the four quadrants.

16 Claims, 5 Drawing Sheets

(56) References Cited

U.S. PATENT DOCUMENTS

| | | |
|---|---|---|
| 2006/0127751 A1 | 6/2006 | Woo |
| 2006/0166088 A1* | 7/2006 | Hokanson et al. ............ 429/161 |
| 2006/0199294 A1 | 9/2006 | Fujikawa et al. |
| 2008/0060189 A1* | 3/2008 | Daidoji et al. ............... 29/623.1 |
| 2009/0092889 A1 | 4/2009 | Hwang et al. |
| 2009/0130548 A1 | 5/2009 | Lee |
| 2009/0239133 A1* | 9/2009 | Kosugi ........................... 429/94 |
| 2010/0081042 A1* | 4/2010 | Morishima et al. ............ 429/94 |
| 2010/0124694 A1* | 5/2010 | Hikata et al. ................... 429/94 |

FOREIGN PATENT DOCUMENTS

| | | | |
|---|---|---|---|
| JP | 2000-138076 | | 5/2000 |
| JP | 2006-286404 | * 10/2006 | ............ H01M 10/40 |
| JP | 2009-094068 A | | 4/2009 |
| KR | 10-2006-0059716 | | 6/2006 |
| KR | 10-0696844 | | 3/2007 |
| KR | 10-0772305 | | 11/2007 |

OTHER PUBLICATIONS

KIPO Office action dated Dec. 22, 2011 for corresponding Korean Patent Application No. 10-2009-0115962, listing the cited references, 4 pages.

English Machine Translation of Japanese Patent No. 2000-138076 listed above, 5 pages.

Korean Patent Abstract Publication No. 1020070062458 A dated Jun. 15, 2007, corresponding to Korean Patent No. 10-0772305 listed above.

Japanese Patent Office action dated Jul. 24, 2012 in corresponding Japanese application 2010-010975 (2 pps).

SIPO Office action dated Nov. 4, 2013, for corresponding Chinese Patent application 201010560122.8, (7 pages).

SIPO Office Action dated May 6, 2014 for CN Application No. 201010560122.8 (9 pages).

* cited by examiner

SECONDARY BATTERY HAVING AN ELECTRODE ASSEMBLY

CROSS-REFERENCE TO RELATED APPLICATION

This application claims priority to and the benefit of Korean Patent Application No. 10-2009-0115962, filed in the Korean Intellectual Property Office on Nov. 27, 2009, the entire content of which is incorporated herein by reference.

BACKGROUND

1. Field

An embodiment relates to a secondary battery.

2. Description of the Related Art

Recently, as electronic industries, communication industries and computer industries are rapidly developed, portable electronic appliances are becoming widely used. Rechargeable secondary batteries are typically used as power sources of these portable electronic appliances.

In general, a secondary battery includes an electrode assembly that includes a positive electrode, a negative electrode and a separator disposed between the positive electrode and the negative electrode. The electrode assembly is stored in a protective member and protected.

In this case, the secondary battery includes a plurality of electrode tabs extending from each of the positive electrode and the negative electrode to connect the positive electrode and the negative electrode to an external device.

SUMMARY

An aspect of an embodiment of the present invention is directed toward a secondary battery including an electrode assembly formed of wound electrodes, in which the positions of a plurality of tabs projecting from the wound electrodes can be controlled.

A secondary battery includes an electrode assembly. The electrode assembly includes a first electrode including a plurality of first electrode tabs extending to a side of the first electrode; a second electrode including a plurality of second electrode tabs extending to a side of the second electrode; and a separator between the first electrode and the second electrode and insulating the first electrode and the second electrode from one another. The electrode assembly is in a wound jelly roll shape. The plurality of first electrode tabs are in one of four quadrants formed by a long axis and a short axis of the wound electrode assembly. The plurality of second electrode tabs are in a different one of the four quadrants.

The plurality of first electrode tabs are in a different nonadjacent quadrant than the plurality of second electrode tabs. That is, when the plurality of first electrode tabs are in a first quadrant of the four quadrants, the plurality of second electrode tabs are in a third quadrant of the four quadrants, and when the plurality of first electrode tabs are in a second quadrant of the four quadrants, the plurality of second electrode tabs are in a fourth quadrant of the four quadrants.

The four quadrants formed by the long axis and the short axis of the wound electrode assembly are defined as the first quadrant, the second quadrant, the third quadrant and the fourth quadrant from a right upper quadrant to a right lower quadrant about an intersection point of the long axis and the short axis of the wound electrode assembly, proceeding counterclockwise from the right upper quadrant.

The first quadrant is not adjacent to the third quadrant, and the second quadrant is not adjacent to the fourth quadrant.

The electrode assembly may satisfy Formula 1, $$A=2C+T_J, \text{ and } B<C/3$$

where A is a distance between each of the plurality of first electrode tabs on the unwound first electrode or each of the plurality of second electrode tabs on the unwound second electrode, B is a distance between each of the plurality of first electrode tabs and a nearest second electrode tab of the plurality of second electrode tabs on the stacked and unwound first electrode and second electrode, C is a long axis length of the long axis of the wound electrode assembly and $T_J$ is a short axis length of the short axis of the wound electrode assembly.

The electrode assembly may satisfy Formula 2, $$((C-5)/2-(T_P+T_N+2T_S)\times N\times 1.05)>0$$

where B is a distance between each of the plurality of first electrode tabs and a nearest second electrode tab of the plurality of second electrode tabs on the stacked and unwound first electrode and second electrode, C is a long axis length of the long axis of the wound electrode assembly, $T_P$ is a thickness of the first electrode, $T_N$ is a thickness of the second electrode, $T_S$ is a thickness of the separator, and N is a winding number of the wound electrode assembly.

The secondary battery may further include a first electrode lead connected to the plurality of first electrode tabs and a second electrode lead connected to the plurality of second electrode tabs. An end of the first electrode lead connected to the plurality of first electrode tabs has a width that is less than half a length of the long axis of the wound electrode assembly. An end of the second electrode lead connected to the plurality of second electrode tabs has a width that is less than half the length of the long axis of the wound electrode assembly.

An embodiment of a secondary battery includes an electrode assembly including a first electrode including a plurality of first electrode tabs extending to a side of the first electrode; a second electrode including a plurality of second electrode tabs extending to a side of the second electrode; and a separator between the first electrode and the second electrode and insulating the first electrode and the second electrode from one another, wherein the electrode assembly is in a wound jelly roll shape, the plurality of first electrode tabs are in a first or second quadrant of four quadrants formed by a long axis and a short axis of the wound electrode assembly, and the plurality of second electrode tabs are in a third or fourth quadrant of the four quadrants.

The four quadrants formed by the long axis and the short axis of the wound electrode assembly are defined as the first quadrant, the second quadrant, the third quadrant and the fourth quadrant from a right upper quadrant to a right lower quadrant about an intersection point of the long axis and the short axis of the wound electrode assembly, proceeding counterclockwise from the right upper quadrant.

The first quadrant is adjacent to the second quadrant and the fourth quadrant, the second quadrant is adjacent to the first quadrant and the third quadrant, the third quadrant is adjacent to the second quadrant and the fourth quadrant, and the fourth quadrant is adjacent to the third quadrant and the first quadrant.

The electrode assembly may satisfy Formula 3, $$A=2C+T_j \text{ and } 5\text{ mm}<B<C/2$$

where A is a distance between each of the plurality of first electrode tabs on the unwound first electrode or each of the plurality of second electrode tabs on the unwound second electrode, B is a distance between each of the first electrode tabs and a nearest second electrode tab of the plurality of second electrode tabs on the stacked and unwound first electrode and second electrode, C is a long axis length of the long axis of the wound electrode assembly, and $T_J$ is a short axis length or the short axis of the wound electrode assembly.

The electrode assembly may satisfy Formula 4, $$((C-T_J)-(T_P+T_N+2T_S)\times N\times 1.05)>0$$

where B is a distance between each of the plurality of first electrode tabs and a nearest second electrode tab of the plurality of second electrode tabs on the stacked and unwound first electrode and second electrode, C is a long axis length of the long axis of the wound electrode assembly, $T_J$ is a short axis length of the short axis of the wound electrode assembly, $T_P$ is a thickness of the first electrode, $T_N$ is a thickness of the second electrode, $T_S$ is a thickness of the separator, and N is a winding number of the wound electrode assembly.

The secondary battery may further include a first electrode lead connected to the plurality of first electrode tabs; and a second electrode lead connected to the plurality of second electrode tabs, wherein an end of the first electrode lead connected to the plurality of first electrode tabs has a width that is less than a length of the long axis of the wound electrode assembly, and an end of the second electrode lead connected to the plurality of second electrode tabs has a width that is less than the length of the long axis of the wound electrode assembly.

The electrode assembly may include a core separator at a center portion thereof, and the core separator may extend along the long axis of the wound electrode assembly.

The long axis of the wound electrode assembly may be an X axis.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification. Hereinafter, embodiments of the present invention will be described in detail with reference to the accompanying drawings.

Figure 1:
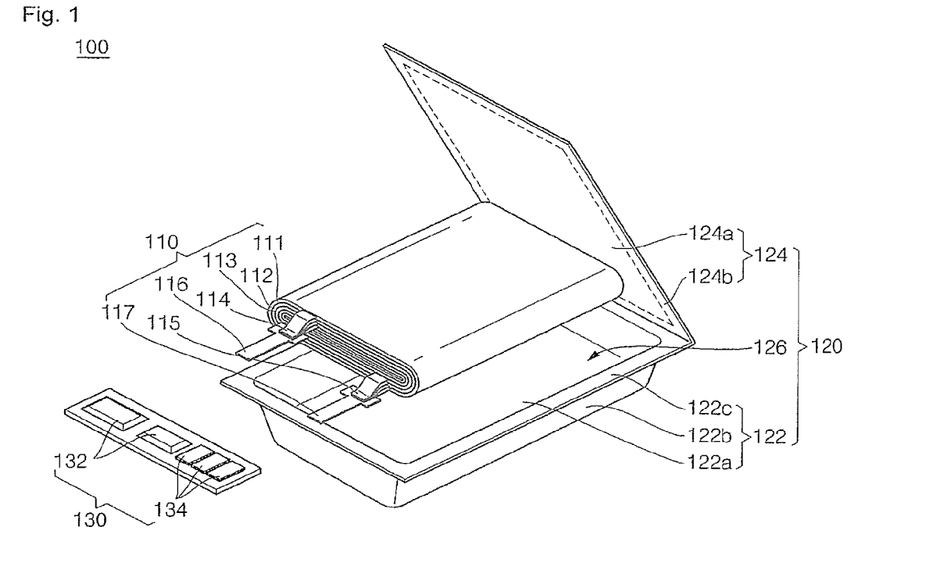
FIG. 1 is a perspective view illustrating a secondary battery according to an embodiment.

FIG. 1 is a perspective view illustrating a secondary battery according to an embodiment.

Figure 2A:
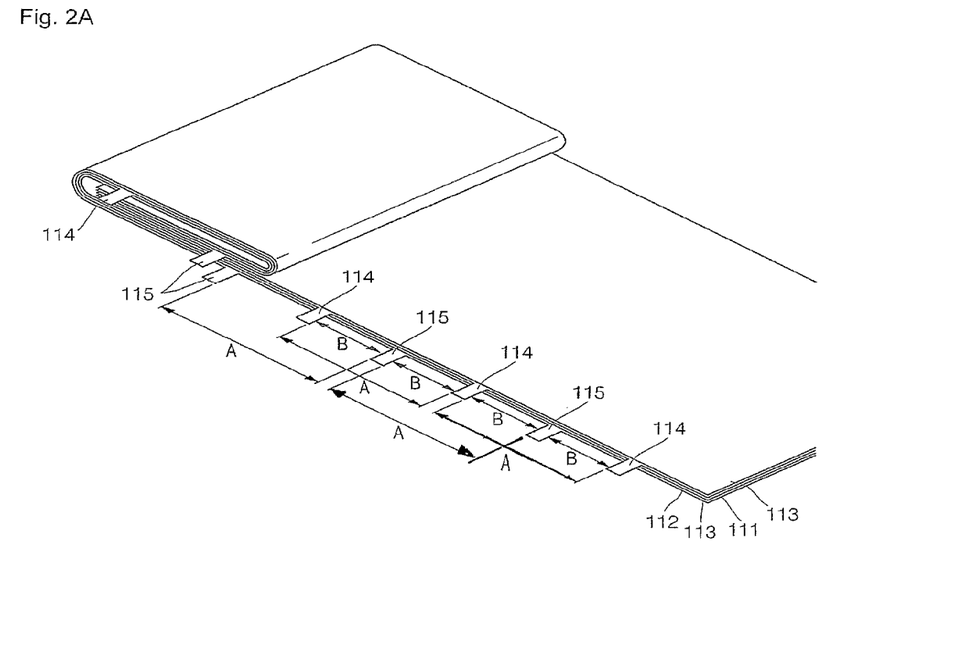
FIG. 2A is a perspective view illustrating a first electrode and a second electrode of an electrode assembly constituting the secondary battery of FIG. 1.

FIG. 2A is a perspective view illustrating a first electrode and a second electrode of an electrode assembly constituting the secondary battery of FIG. 1.

Figure 2B:
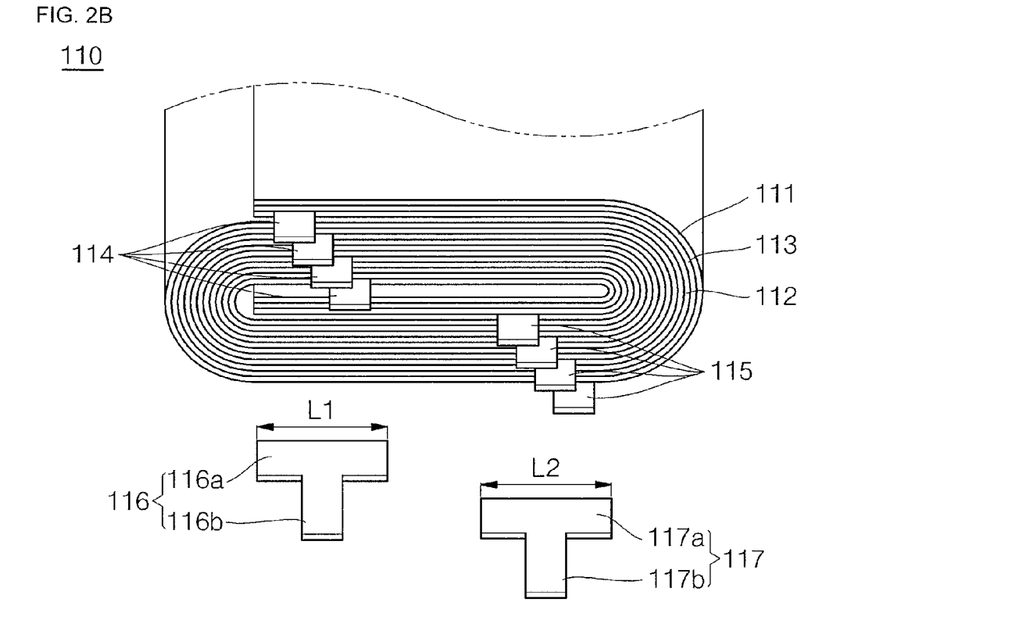
FIGS. 2B and 2C are schematic views illustrating a side surface of the electrode assembly of FIG. 2A.
Figure 2C:
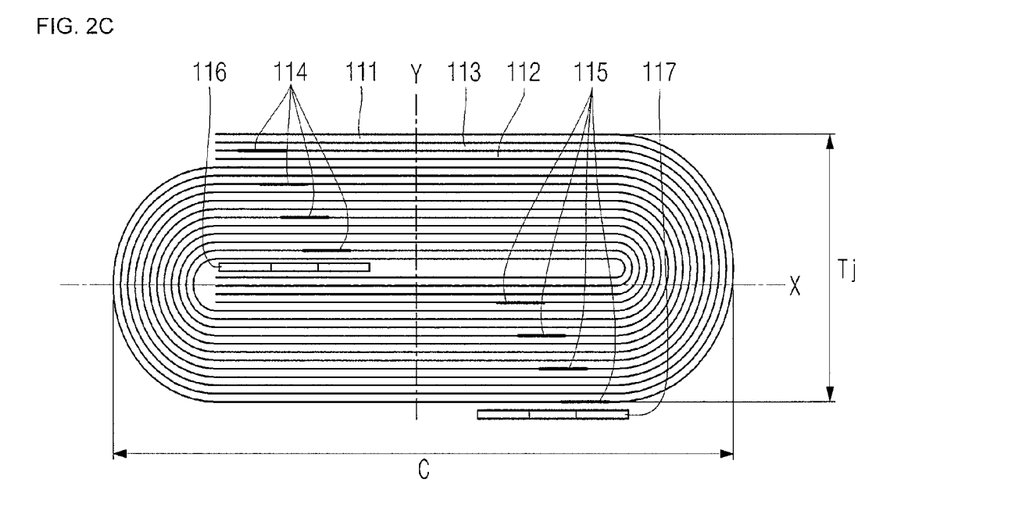

FIGS. 2B and 2C are schematic views illustrating a side surface of the electrode assembly of FIG. 2A.

Referring to FIGS. 1 through 2C, an embodiment of a secondary battery 100 includes an electrode assembly 110, a protective member 120 receiving the electrode assembly 110 and a protective circuit module 130.

The electrode assembly 110 includes a first electrode 111, a second electrode 112, two separators 113, a plurality of first electrode tabs 114, a plurality of second electrode tabs 115, a first electrode lead 116 and a second electrode lead 117.

In one embodiment, the first electrode 111 is a positive electrode and the second electrode 112 is a negative electrode. In another embodiment, the first electrode 111 is a negative electrode and the second electrode 112 is a positive electrode.

The first electrode 111 includes the plurality of first electrode tabs 114 extending to a side of the first electrode 111.

The plurality of first electrode tabs 114 extending to the side of the first electrode 111 are each spaced an identical distance A from each other when the first electrode 111 is unwound.

The second electrode 112 may have an identical shape to that of the first electrode 111. The second electrode 112 includes the plurality of second electrode tabs 115 extending to a side of the second electrode 112. The plurality of second electrode tabs 114 are each spaced the identical distance A from each other when the second electrode 112 is unwound. Each of the plurality of second electrode tabs 115 is spaced an identical distance B away from the nearest first electrode tab of the plurality of first electrode tabs 114 when the first electrode 111 and the second electrode 112 are stacked but unwound.

The separators 113 are disposed between the first electrode 111 and the second electrode 112 to electrically insulate the first electrode 111 and the second electrode 112 from one another. In the current embodiment, the number of the separators 113 provided to the electrode assembly 110 is two, and the separators 113 insulate the first electrode 111 and the second electrode 112. However, the number of the separators 113 may be three or greater, or a single separator 113 may be provided.

Furthermore, although the electrode assembly 110 is shown to include at least one of the separators 113, the separator 113 may be omitted. That is, an insulating layer replacing the separator 113 may be disposed on at least one surface of the first electrode 111 or the second electrode 112. The insulating layer replacing the separator 113 may be formed using a suitable coating method, for example liquid coating.

According to the current embodiment, the electrode assembly 110 includes the first electrode 111 and the second electrode 112 with the plurality of first electrode tabs 114 and the plurality of second electrode tabs 115 having the identical distance A and the identical distance B, and the two separators 113. The plurality of first electrode tabs 114 and the plurality of second electrode tabs 115 both extend to one side of the electrode assembly 110. The two separators 113 insulate the first electrode 111 and the second electrode 112 from one another.

The electrode assembly 110 has a jelly roll shape that is formed by sequentially stacking the second electrode 112, a first one of the separators 113, the first electrode 111, and a second one of the separators 113, and then winding the stack starting from one end to the other end, as illustrated in FIG. 2A.

Since the electrode assembly 110 has a jelly roll shape, it has a corresponding a winding number, which is the number of times the first electrode 111, the second electrode 112, and the separators 113 are rolled. As the winding number is increased, the outer diameter of the electrode assembly 110 is gradually increased. Thus, the positions of the pluralities of first and second electrode tabs 114 and 115 as projecting from the side of the jelly roll shape of the electrode assembly 110 are varied.

In this case, the distance A between each of the plurality of first electrode tabs 114 on the unwound first electrode 111, the distance A between each of the plurality of second electrode tabs 115 on the unwound second electrode 112 and the distance B between each of the plurality of first electrode tabs 114 and the nearest second electrode tab of the plurality of second electrode tabs 115 on the stacked and unwound first electrode 111 and second electrode 112 are appropriately adjusted to space the pluralities of first and second electrode tabs 114 and 115 of the wound electrode assembly 110 apart from each other as illustrated in FIG. 2C.

In a side surface of the electrode assembly 110 shown in FIG. 2C, that is, on a side surface of the electrode assembly 110 where the plurality of first electrode tabs 114 and the plurality of second electrode tabs 115 extend, a long axis with respect to a center of the side surface of the electrode assembly 110 is referred to as an X axis, and a short axis with respect to the center of the side surface of the electrode assembly 110 is referred to as a Y axis. An intersection point is located at an intersection of the X axis and the Y axis. Thus, as illustrated in FIG. 2C, the electrode assembly 110 is divided into four quadrants. The quadrants are defined as a first quadrant, a second quadrant, a third quadrant and a fourth quadrant from a right upper quadrant to a right lower quadrant about the intersection point, proceeding counterclockwise from the right upper quadrant.

In one embodiment, the plurality of first electrode tabs 114 and the plurality of second electrode tabs 115 are each disposed in a single quadrant. In addition, the plurality of first electrode tabs 114 is disposed in different nonadjacent quadrant than the plurality of second electrode tabs 115. In one embodiment, as illustrated in FIG. 2C, the plurality of first electrode tabs 114 are disposed in the second quadrant, and the plurality of second electrode tabs 115 are disposed in the fourth quadrant. In another embodiment, the plurality of first electrode tabs 114 are disposed in the first quadrant, and the plurality of second electrode tabs 115 are disposed in the third quadrant. Likewise, in other embodiments, when the plurality of first electrode tabs 114 are disposed in the third quadrant, the plurality of second electrode tabs 115 are disposed in the first quadrant; and when the plurality of first electrode tabs 114 are disposed in the fourth quadrant, the plurality of second electrode tabs 115 are disposed in the second quadrant.

In one embodiment, the distance A between each of the plurality of first electrode tabs 114 on the unwound first electrode 111, the distance A between each of the plurality of second electrode tabs 115 on the unwound second electrode 112 and the distance B between each of the plurality of first electrode tabs 114 and the nearest second electrode tab of the plurality of second electrode tabs 115 on the stacked and unwound first electrode 111 and second electrode 112 are chosen to satisfy Formula 1. In one embodiment, distances A and B satisfy Formula 1 such that the plurality of first electrode tabs 114 and the plurality of second electrode tabs 115 in the wound electrode assembly are disposed in different nonadjacent quadrants as described above.

$$A = 2C + T_J, \text{ and } B < C/3$$

where A is the distance between each of the plurality of first electrode tabs 114 or each of the plurality of second electrode tabs 115 on the unwound first electrode 111 and the unwound second electrode 112, B is the distance between each of the plurality of first electrode tabs 114 and the nearest second electrode tab of the plurality of second electrode tabs 115 on the stacked and unwound first electrode 111 and second electrode 112, C is the long axis length of the wound electrode assembly 110 and $T_J$ is the short axis length of the wound electrode assembly 110.

According to one embodiment satisfying Formula 1, in the first electrode 111 of the electrode assembly 110 included in the secondary battery 100, the plurality of first electrode tabs 114 are spaced apart from each other on the unwound first electrode 111 by a distance given by subtracting the short axis length $T_J$ of the wound electrode assembly 110 from two times the long axis length C of the wound electrode assembly 110. Likewise, in the second electrode 112 of the electrode assembly 110 included in the secondary battery 100, the plurality of second electrode tabs 115 are spaced apart from each other on the unwound second electrode 112 by the distance given by subtracting the short axis length $T_J$ of the wound electrode assembly 110 from two times the long axis length C of the wound electrode assembly 110. In one embodiment satisfying Formula 1, the distance B between each of the plurality of first electrode tabs 114 and the nearest second electrode tab of the plurality of second electrode tabs 115 on the stacked and unwound first electrode 111 and second electrode 112 is less than one third the long axis length C of the wound electrode assembly 110.

In one embodiment, the plurality of first electrode tabs 114 and the plurality of second electrode tabs 115 of the first electrode 111 and the second electrode 112 constituting the electrode assembly 110 are chosen to satisfy Formula 2.

$$((C-5)/2 - (T_P + T_N + 2T_S) \times N \times 1.05) > 0$$

where B is the distance between each of the first electrode tabs 114 and the nearest second electrode tab of the plurality of second electrode tabs 115 on the stacked and unwound first electrode 111 and second electrode 112, C is the long axis length of the wound electrode assembly 110, $T_P$ is the thickness of the first electrode 111, $T_N$ is the thickness of the second electrode 112, $T_S$ is the combined thickness of the separators 113 and N is a winding number of the wound electrode assembly 110.

In one embodiment, Formula 2 limits the relationship between the distance B between each of the plurality of first electrode tabs 114 and the nearest second electrode tab of the plurality of second electrode tabs 115 on the stacked and unwound first electrode 111 and second electrode 112, the long axis length C of the wound electrode assembly 110, the thickness $T_P$ of the first electrode 111, the thickness $T_N$ of the second electrode 112, the combined thickness $T_S$ of the separators 113 and the winding number N of the wound electrode assembly 110. When the distance B between each of the plurality of first electrode tabs 114 and the nearest second electrode tab of the plurality of second electrode tabs 115 on the stacked and unwound first electrode 111 and second electrode 112, the long axis length C of the wound electrode assembly 110, the thickness $T_P$ of the first electrode 111, the thickness $T_N$ of the second electrode 112, the combined thickness $T_S$ of the separators 113 and the winding number N of the wound electrode assembly 110 satisfy Formula 2, the plurality of first electrode tabs 114 and the plurality of second electrode tabs 115 of the wound electrode assembly 110 are respectively disposed in different nonadjacent quadrants as described above.

In one embodiment, the plurality of first electrode tabs 114 of the electrode assembly 110 is connected to a first electrode lead 116, and the plurality of second electrode tabs 115 of the electrode assembly 110 is connected to a second electrode lead 117.

The first electrode lead 116 includes an end 116a contacting the plurality of first electrode tabs 114, and an extension part 116b extending from the end 116a and connected to an external device such as the protective circuit module 130.

The end 116a of the first electrode lead 116 is electrically connected to the plurality of first electrode tabs 114.

In one embodiment, the end 116a of the first electrode lead 116 has a set or predetermined width L1.

In one embodiment, the plurality of first electrode tabs 114 are physically connected to each other using a suitable method such as resistance welding, laser welding, ultrasonic welding and/or soldering welding. The physically connected plurality of first electrode tabs 114 are then electrically and physically connected to the end 116a of the first electrode lead 116. The width L1 of the end 116a may have any value provided that the width L1 of the end 116a is less than half the long axis length C of the side surface of the wound electrode assembly 110. However, the width L1 of the end 116a may be greater than the width of each of the plurality of first electrode tabs 114. Since the plurality of first electrode tabs 114 are connected in parallel to the first electrode lead 116, the electrical resistance may be improved (or lowered).

In one embodiment where each of the plurality of first electrode tabs 114 is individually or simultaneously connected to the end 116a using a method such as resistance welding, laser welding, ultrasonic welding or soldering welding without electrically and physically connecting the first electrode tabs 114 to each other, the width L1 of the end 116a is less than half the long axis length C of the side surface of the wound electrode assembly 110, and greater than the distance between the outermost two first electrode tabs of the plurality of first electrode tabs 114 on the wound electrode assembly 110. Thus, the connection between the plurality of first electrode tabs 114 and the first electrode lead 116 is electrically and physically stable since each of the plurality of first electrode tabs 114 may contact the first electrode lead 116 without bending or stretching any of the plurality of first electrode tabs 114 in the direction of the long axis, which is the X axis.

Similar to the first electrode lead 116, the second electrode lead 117 according to one embodiment includes an end 117a and an extension part 117b extending from the end 117a. Like the end 116a of the first electrode lead 116, the end 117a of the second electrode lead 117 has a set or predetermined width L2. In one embodiment the width L2 of the end 117a is determined in the same manner as that of the width L1 of the first electrode lead 116, and a more detailed description of the width L2 will not be provided again.

In one embodiment, the protective member 120 receives and protects the electrode assembly 110. The protective member 120 may be a pouch type protective member as illustrated in FIG. 1, or a prismatic type protective member. In the current embodiment, the protective member 120 is a pouch type, and descriptions with respect to a pouch type protective member are made, but the present invention is not limited thereto.

In one embodiment, the protective member 120 includes a main body 122, a cover 124 and a receiving part 126.

The main body 122 includes a bottom surface 122a and a plurality of side surfaces 122b extending from the bottom surface 122a and a sealing part 112c extending from the plurality of side surfaces 122b.

The receiving part 126 is a space formed by the bottom surface 122a and the plurality of side surfaces 122b of the main body 122, and receives the electrode assembly 110.

The cover 124 extends from an edge of the sealing part 122c of the main body 122. The cover 124 is configured to entirely cover the receiving part 126 and to form a seal with the sealing part 122c of the main body 122, so as to seal the secondary battery 100 within the protective member 120. Thus, the cover 124 includes a cover region 124a and a sealing part 124b corresponding to the sealing part 122c of the main body 122.

In one embodiment, the protective circuit module 130 controls the charge and discharge of the electrode assembly 110 and the operation of the electrode assembly 110. The protective circuit module 130 includes a control device 132, such as an IC device, to prevent or protect from an overcurrent from flowing into the secondary battery 100. The protective circuit module 130 also includes external terminals 134 for connecting the secondary battery 100 to an external device. Although the control device 132 and the external terminals 134 are provided on an identical surface of the protective circuit module 130 in the embodiment shown in FIG. 1, the control device 132 and the external terminals 134 may be provided on different surfaces. The protective circuit module 130 is electrically connected to the first electrode lead 116 and the second electrode lead 117.

Figure 3:
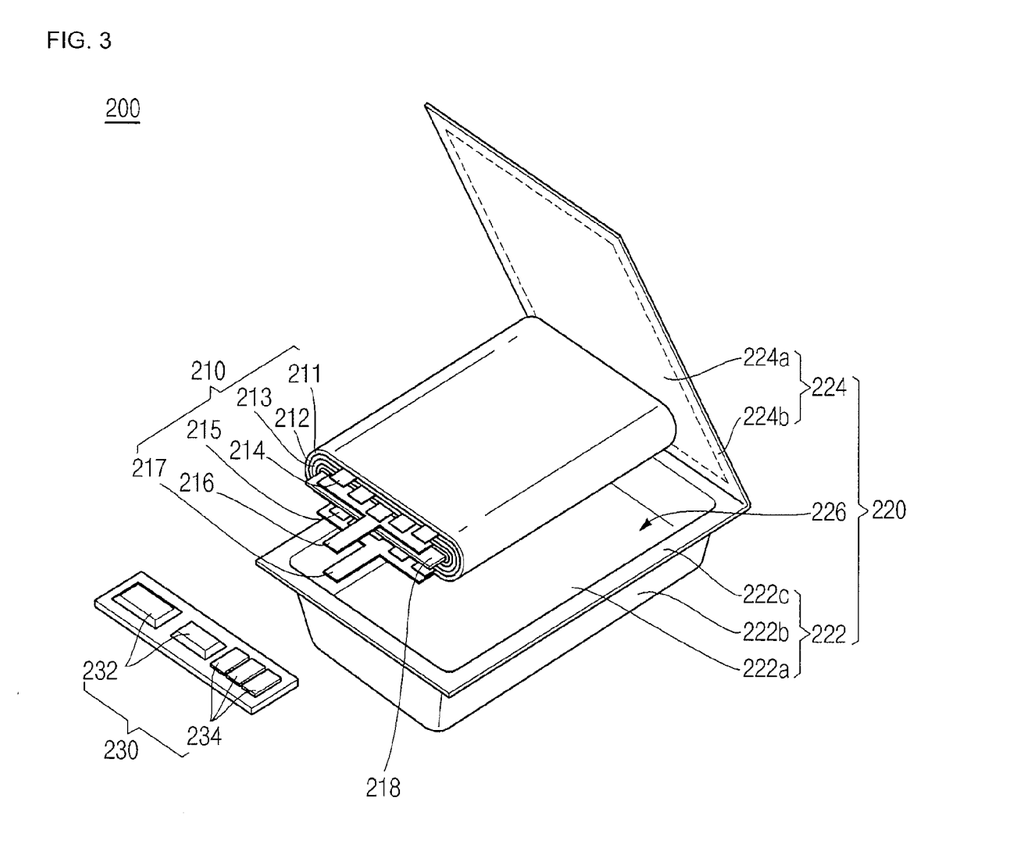
FIG. 3 is a perspective view illustrating a secondary battery according to another embodiment.

FIG. 3 is a perspective view illustrating a secondary battery according to another embodiment.

Figure 4A:
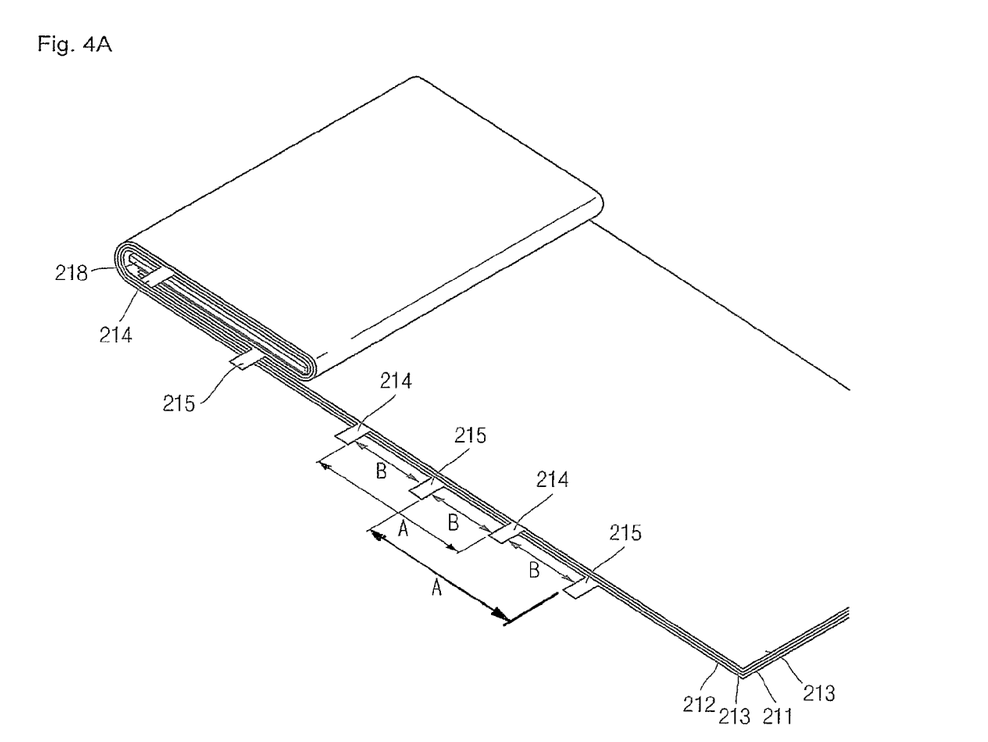
FIG. 4A is a perspective view illustrating a first electrode and a second electrode of an electrode assembly constituting the secondary battery of FIG. 3.

FIG. 4A is a perspective view illustrating a first electrode and a second electrode of an electrode assembly constituting the secondary battery of FIG. 3.

Figure 4B:
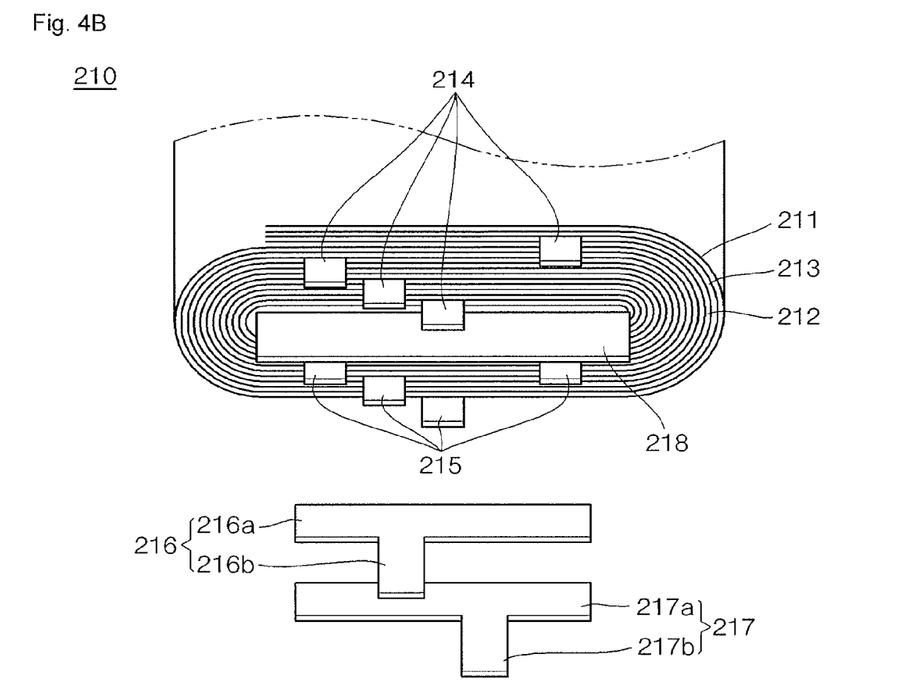
FIGS. 4B and 4C are schematic views illustrating a side surface of the electrode assembly of FIG. 4A.
Figure 4C:
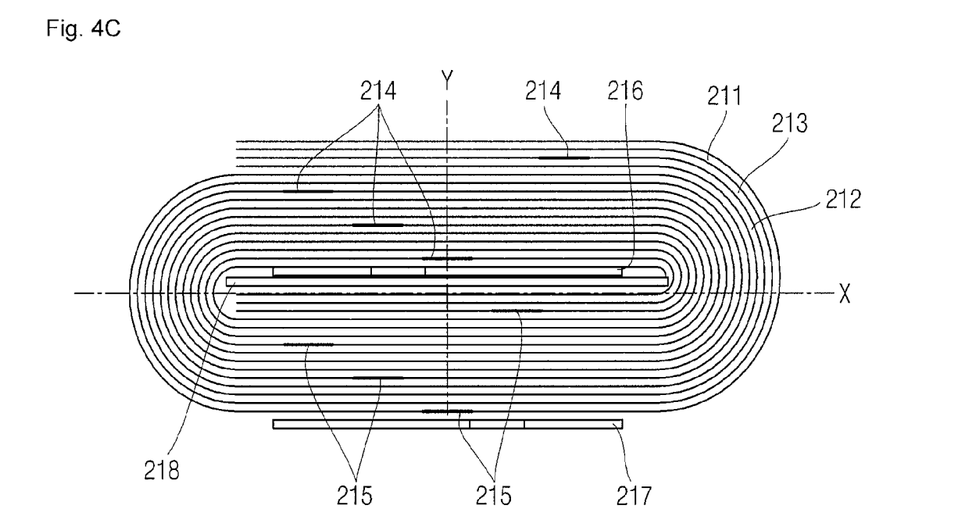

FIGS. 4B and 4C are schematic views illustrating a side surface of the electrode assembly of FIG. 4A.

Referring to FIGS. 3 through 4C, a secondary battery 200 includes an electrode assembly 210, a protective member 220 receiving the electrode assembly 210, and a protective circuit module 230.

The electrode assembly 210 includes a first electrode 211, a second electrode 212, two separators 213, a plurality of first electrode tabs 214, a plurality of second electrode tabs 215, a first electrode lead 216, a second electrode lead 217 and a core separator 218.

Since the electrode assembly 210 is similar to the electrode assembly 110 of the secondary battery 100, descriptions will be made with respect to differences between the previous embodiment and the current embodiment. A part that is not described in the current embodiment is substantially the same as that of the secondary battery 100 described with reference to FIGS. 1 through 2C.

The electrode assembly 210 includes the plurality of first electrode tabs 214 extending to a side of the first electrode 211, and the plurality of second electrode tabs 215 extending to a side of the second electrode 212.

The plurality of first electrode tabs 214 and the plurality of second electrode tabs 215 have separation distances A and B that are referred like the plurality of first electrode tabs 114 and the plurality of second electrode tabs 115.

However, in this one embodiment, the plurality of first electrode tabs 214 of the wound electrode assembly 210 are disposed in the two upper quadrants, and the plurality of second electrode tabs 215 of the wound electrode assembly 210 are disposed in the two lower quadrants with respect to the X axis and the Y axis. In another embodiment, the plurality of first electrode tabs 214 of the wound electrode assembly 210 are disposed in the two lower quadrants, and the plurality of second electrode tabs 215 of the wound electrode assembly 210 are disposed in the two upper quadrants with respect to the X axis and the Y axis. These configurations are unlike the plurality of first electrode tabs 114 and the plurality of second electrode tabs 115, which occupy single, different nonadjacent quadrants.

That is, as shown, the plurality of first electrode tabs 214 are disposed in the first or second quadrant, and the plurality of second electrode tabs 215 are disposed in the third or fourth quadrant.

In one embodiment, the electrode assembly 210 includes the core separator 218 having a set or predetermined length along the X axis that is a long axis of the wound electrode assembly 210.

The core separator 218 insulates the plurality of first electrode tabs 214 from the plurality of second electrode tabs 215. In the absence of a core separator 218, the possibility of the plurality of first electrode tabs 214 contacting the plurality of second electrode tabs 215 is high since the plurality of first electrode tabs 214 and the plurality of second electrode tabs 215 are respectively distributed in the first or second quadrant and the third or fourth quadrant in the wound electrode assembly 210. The first quadrant is adjacent to the fourth quadrant, and the second quadrant is adjacent to the third quadrant. A core separator may not be necessary in the embodiment where the plurality of first electrode tabs 114 and the plurality of second electrode tabs 115 are disposed in different nonadjacent quadrants.

In one embodiment, the core separator 218 has a width that is greater than a width L3 of an end 216a of the first electrode lead 216, a width L4 of an end 217a of the second electrode lead 217. In one embodiment, the core separator 218 has a width that is greater than both the distance between the outermost edges of the outermost two first electrode tabs of the plurality of first electrode tabs 214 and the distance between the outermost edges of the outermost two second electrode tabs of the plurality of second electrode tabs 215 of the wound electrode assembly 210. That is, the core separator 218 both has a sufficiently large width and is positioned to prevent or protect from any of the plurality of first electrode tabs 214 from contacting any of the plurality of second electrode tabs 215, and to prevent the first electrode lead 216 from contacting the second electrode lead 217 on the wound electrode assembly 210.

In one embodiment of the electrode assembly 210, the distance A between each of the plurality of first electrode tabs 214 on the unwound first electrode 211, the distance A between each of the plurality of second electrode tabs 215 on the unwound second electrode 212, and the distance B between each of the plurality of first electrode tabs 214 and the nearest second electrode tab of the plurality of second electrode tabs 215 on the stacked and unwound first electrode 211 and second electrode 212 are chosen to satisfy Formula 3. In one embodiment where A and B satisfy Formula 3, the plurality of first electrode tabs 214 are disposed in the first or second quadrant and the plurality of second electrode tabs 215 are disposed in the third or fourth quadrant of the wound electrode assembly 210 as described above.

$$A = 2C + T_J \text{ and } 5\text{ mm} < B < C/2$$

where A is the distance between each of the plurality of first electrode tabs 214 on the unwound first electrode 211 and each of the plurality of second electrode tabs 215 on the unwound second electrode 212, B is the distance between each of the plurality of first electrode tabs 214 and the nearest second electrode tab of the plurality of second electrode tabs 215 on the stacked and unwound first electrode 211 and second electrode 212, C is the long axis length of the wound electrode assembly 210, and $T_J$ is the short axis length of the wound electrode assembly 210.

In one embodiment satisfying Formula 3, in the first electrode 211 of the electrode assembly 210 included in the secondary battery 200, the plurality of first electrode tabs 214 are spaced apart from each other on the unwound first electrode 211 by a distance given by subtracting the short axis length $T_J$ of the wound electrode assembly 210 from two times the long axis length C of the wound electrode assembly 210. Likewise, in the second electrode 212 of the electrode assembly 210 included in the secondary battery 200, the plurality of second electrode tabs 215 are spaced apart from each other on the unwound second electrode 212 by the distance given by subtracting the short axis length $T_J$ of the wound electrode assembly 210 from two times the long axis length C of the wound electrode assembly 210. In one embodiment satisfying Formula 3, the distance B between each of the plurality of first electrode tabs 214 and the nearest second electrode tab of the plurality of second electrode tabs 215 on the stacked and unwound first electrode 211 and second electrode 212 is greater than 5 mm, and is less than half the long axis length C of the wound electrode assembly 210.

In one embodiment, the plurality of first electrode tabs 214 and the plurality of second electrode tabs 215 of the first electrode 211 and the second electrode 212 included in the electrode assembly 210 are positioned to satisfy Formula 4.

$$((C - T_J) - (T_P + T_N + 2T_S) \times N \times 1.05) > 0$$

where B is the distance between each of the first electrode tabs 214 and the nearest second electrode tab of the plurality of second electrode tabs 215 on the stacked and unwound first electrode 211 and second electrode 212, C is the long axis length of the wound electrode assembly 210, $T_J$ is the short axis length of the wound electrode assembly 210, $T_P$ is the thickness of the first electrode 211, $T_N$ is the thickness of the second electrode 212, $T_S$ is the combined thickness of the separators 213 and N is a winding number of the wound electrode assembly 210.

In one embodiment, Formula 4 limits the relationship between the distance B between each of the first electrode tabs 214 and the nearest second electrode tab of the plurality of second electrode tabs 215 on the stacked and unwound first electrode 211 and second electrode 212, the long axis length C of the wound electrode assembly 210, the thickness $T_P$ of the first electrode 211, the thickness $T_N$ of the second electrode 212, the combined thickness $T_S$ of the separators 213 and the winding number N of the wound electrode assembly 210. In one embodiment where the distance B between each of the plurality of first electrode tabs 214 and the nearest second electrode tab of the plurality of second electrode tabs 215 on the stacked and unwound first electrode 211 and second electrode 212, the long axis length C of the wound electrode assembly 210, the thickness $T_P$ of the first electrode 211, the thickness $T_N$ of the second electrode 212, the combined thickness $T_S$ of the separators 213 and the winding number N of the wound electrode assembly 210 satisfy Formula 4, the plurality of first electrode tabs 214 are disposed in the first or second quadrant, and the plurality of second electrode tabs 215 are disposed in the third or fourth quadrant as described above.

In one embodiment, the plurality of first electrode tabs 214 are connected to the first electrode lead 215 and the plurality of second electrode tabs 215 of the electrode assembly 210 are connected to the second electrode lead 217.

In one embodiment, the first electrode lead 216 includes an end 216a contacting the plurality of first electrode tabs 214 and an extension part 216b extending from the end 216a and connected to an external device such as the protective circuit module 230.

In one embodiment, the first electrode lead 216 has a set or predetermined width L3 that is shorter than the long axis length C of the side surface of the wound electrode assembly 210. In another embodiment, the width L3 is shorter than the long axis length C of the side surface of the wound electrode assembly 210 and greater than the distance between the outermost first electrode tabs of the plurality of first electrode tabs 214.

In one embodiment, like the first electrode lead 216, the second electrode lead 217 includes an end 217a and an extension part 217b extending from the end 217a. Similar to the end 216a of the first electrode lead 216, the end 217a of the second electrode lead 217 has a set or predetermined width L4. In this case, since the width L4 of the end 217a is determined in the same manner as that of the width L3 of the first electrode lead 216, a more detailed description thereof will be omitted.

In one embodiment, the first electrode lead 216 and the second electrode lead 217 have extension parts 216b and 217b with different configurations than the extension parts 116b and 117b of the first electrode lead 116 and the second electrode lead 117 of the secondary battery 100.

The extension part 216b may extend from the left side portion of the end 216a, and the extension part 217b may extend from the right side portion of the end 217a as illustrated in FIG. 4, instead of extending from the center portions as in the first electrode lead 116 and the second electrode lead 117. Thus, offsetting the extension parts 216b and 217b prevents overlapping of the extension parts 216b and 217b when the electrode assembly 210 is stored in the protective member 220.

With regard to FIG. 3, the protective member 220 and the protective circuit module 230, which are substantially the same as the protective member 120 and the protective circuit module 130 of FIGS. 1 through 2C, will be described.

In one embodiment, the protective member 220 includes a main body 222, a cover 224 and a receiving part 226.

The main body 222 includes a bottom surface 222a, a plurality of side surfaces 222b extending from the bottom surface 222a and a sealing part 222c extending from the plurality of side surfaces 222b.

The receiving part 226 of the protective member 220 is a space formed by the bottom surface 222a and the plurality of side surfaces 222b, and receives the electrode assembly 210.

In one embodiment, the cover 224 extends from an edge of the sealing part 222c of the main body 222 and includes a cover region 224a and a sealing part 224b.

In one embodiment, the protective circuit module 230 includes a control device 232 and external terminals 234. Further, the protective circuit module 230 is electrically connected to both the first electrode lead 216 and the second electrode lead 217.

According to embodiments of the present invention and in view of the foregoing, the positions of the tabs of the electrodes constituting the wound electrode assembly can be controlled.

While the present invention has been described in connection with certain exemplary embodiments, its is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery comprising an electrode assembly, the electrode assembly comprising:
    a first electrode comprising a plurality of first electrode tabs extending to a side of the first electrode;
    a second electrode comprising a plurality of second electrode tabs extending to a side of the second electrode;
    a first separator between the first electrode and the second electrode and insulating the first electrode and the second electrode from one another;
    a second separator between the second electrode and the first electrode of a next wrap and insulating the second electrode and the first electrode from one another; and
    a first electrode lead connected to the plurality of first electrode tabs,
    wherein the electrode assembly comprises a core separator at a center portion thereof, and the core separator extends along a long axis of the wound electrode assembly and is distinct from the first and second separators,
    wherein the electrode assembly is in a wound jelly roll shape,
    wherein the plurality of first electrode tabs are on a first end of the wound electrode assembly in one of quadrants formed by the long axis and a short axis of the first end of the wound electrode assembly,
    wherein the plurality of second electrode tabs are on the first end of the wound electrode assembly in a different one of the quadrants, and
    wherein the core separator extends to a side of the first electrode and the second electrode between the plurality of first electrode tabs and the plurality of second electrode tabs in a direction of the short axis.

2. The secondary battery as claimed in claim 1, wherein, when the plurality of first electrode tabs are in a first quadrant of the quadrants, the plurality of second electrode tabs are in a third quadrant of the quadrants, and
    when the plurality of first electrode tabs are in a second quadrant of the quadrants, the plurality of second electrode tabs are in a fourth quadrant of the quadrants.

3. The secondary battery as claimed in claim 2, wherein the quadrants formed by the long axis and the short axis of the wound electrode assembly are defined as the first quadrant, the second quadrant, the third quadrant and the fourth quadrant from a right upper quadrant to a right lower quadrant about an intersection point of the long axis and the short axis of the wound electrode assembly, proceeding counterclockwise from the right upper quadrant.

4. The secondary battery as claimed in claim 2, wherein the first quadrant is not adjacent to the third quadrant, and the second quadrant is not adjacent to the fourth quadrant.

5. The secondary battery as claimed in claim 1, further comprising:
a second electrode lead connected to the plurality of second electrode tabs,
wherein an extension of the first electrode lead connected to the plurality of first electrode tabs has a width that is less than half a length of the long axis of the wound electrode assembly, and
wherein an extension of the second electrode lead connected to the plurality of second electrode tabs has a width that is less than half the length of the long axis of the wound electrode assembly.

6. The secondary battery as claimed in claim 5,
wherein an end of the second electrode lead has a width that is greater than half a length of the long axis of the wound electrode assembly.

7. The secondary battery as claimed in claim 1,
wherein an end of the first electrode lead has a width that is greater than half a length of the long axis of the wound electrode assembly.

8. A secondary battery comprising an electrode assembly, the electrode assembly comprising:
a first electrode comprising a plurality of first electrode tabs extending to a side of the first electrode;
a second electrode comprising a plurality of second electrode tabs extending to a side of the second electrode;
a first separator between the first electrode and the second electrode and insulating the first electrode and the second electrode from one another; and
a second separator between the second electrode and the first electrode of a next wrap and insulating the second electrode and the first electrode from one another; and
a first electrode lead connected to the plurality of first electrode tabs,
wherein the electrode assembly is in a wound jelly roll shape,
wherein the plurality of first electrode tabs are in first and second quadrants of quadrants formed by a long axis and a short axis of the wound electrode assembly, the first quadrant being adjacent to the second quadrant,
wherein the plurality of second electrode tabs are in third and fourth quadrants of the quadrants, the third quadrant being adjacent to the fourth quadrant,
wherein the electrode assembly comprises a core separator at a center portion thereof, and the core separator extends along the long axis of the wound electrode assembly and is distinct from the first and second separators,
wherein an end of the first electrode lead has a width that is greater than half a length of the long axis of the wound electrode assembly, and
wherein the core separator extends to a side of the first electrode and the second electrode between the plurality of first electrode tabs and the plurality of second electrode tabs in a direction of the short axis.

9. The secondary battery as claimed in claim 8, wherein the quadrants formed by the long axis and the short axis of the wound electrode assembly are defined as the first quadrant, the second quadrant, the third quadrant and the fourth quadrant from a right upper quadrant to a right lower quadrant about an intersection point of the long axis and the short axis of the wound electrode assembly, proceeding counterclockwise from the right upper quadrant.

10. The secondary battery as claimed in claim 9, wherein the first quadrant is adjacent to the second quadrant and the fourth quadrant, the second quadrant is adjacent to the first quadrant and the third quadrant, the third quadrant is adjacent to the second quadrant, and the fourth quadrant is adjacent to the third quadrant and the first quadrant.

11. The secondary battery as claimed in claim 8, further comprising:
a second electrode lead connected to the plurality of second electrode tabs,
wherein an extension of the first electrode lead connected to the plurality of first electrode tabs has a width that is less than a length of the long axis of the wound electrode assembly, and
wherein an extension of the second electrode lead connected to the plurality of second electrode tabs has a width that is less than the length of the long axis of the wound electrode assembly.

12. The secondary battery as claimed in claim 11,
wherein an end of the second electrode lead has a width that is greater than half a length of the long axis of the wound electrode assembly.

13. The secondary battery as claimed in claim 8, wherein the long axis of the wound electrode assembly is an X axis.

14. The secondary battery as claimed in claim 8, further comprising:
a second electrode lead connected to the plurality of second electrode tabs, wherein the second electrode lead has a width that is greater than half a length of the long axis of the wound electrode assembly.

15. The secondary battery as claimed in claim 8, wherein the core separator is between the plurality of first electrode tabs and the plurality of second electrode tabs.

16. The secondary battery as claimed in claim 8,
wherein the first quadrant is on same side of the long axis as the second quadrant, and
wherein the third quadrant is on same side of the long axis as the fourth quadrant.

* * * * *